Sept. 27, 1927. 1,643,785
S. G. NOTTAGE
DYNAMO ELECTRIC MACHINE
Filed May 25, 1925
Fig. 1.
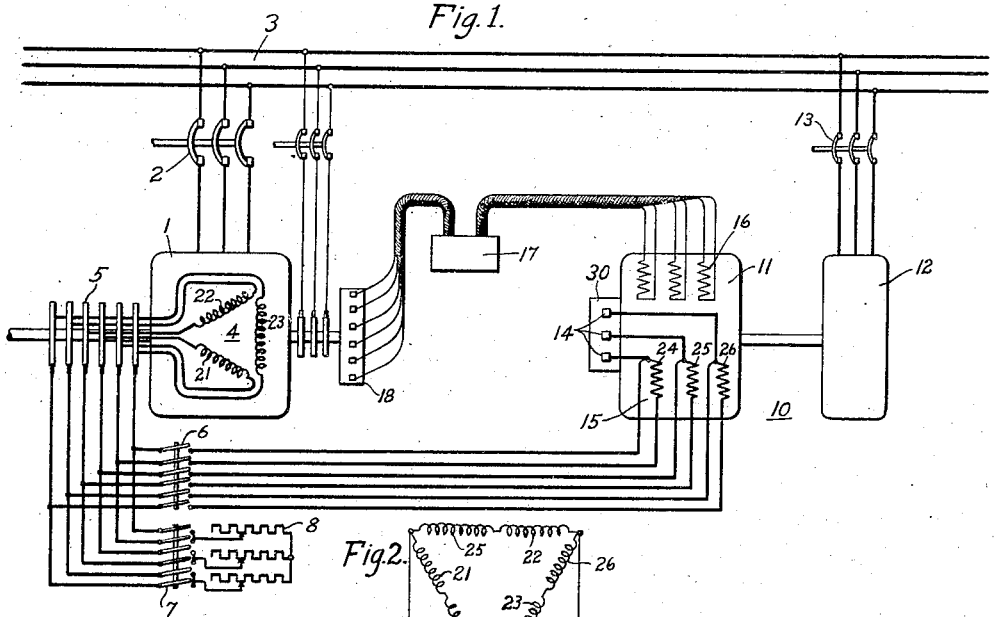
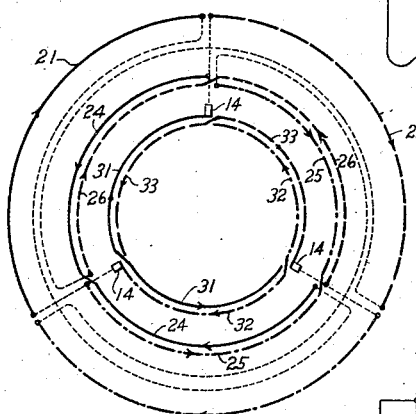
Fig. 3.
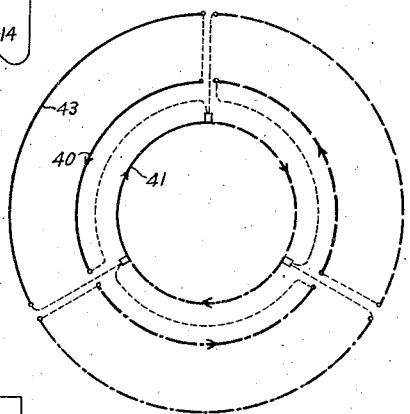
Fig. 4.
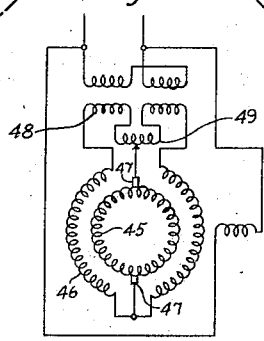
Fig. 5.
WITNESSES:
C. J. Weller.
S. M. Pineles
INVENTOR
Stanley G. Nottage.
BY
Wesley G. Carr
ATTORNEY Patented Sept. 27, 1927.

1,643,785

UNITED STATES PATENT OFFICE.

STANLEY G. NOTTAGE, OF MURRAYSVILLE, PENNSYLVANIA, ASSIGNOR TO WESTINGHOUSE ELECTRIC & MANUFACTURING COMPANY, A CORPORATION OF PENNSYLVANIA.

DYNAMO-ELECTRIC MACHINE.

Application filed May 25, 1925. Serial No. 32,532.

My invention relates to dynamo-electric machines and it has particular relation to alternating-current commutator machines provided with compensating windings for neutralizing the magnetic effect of the armature currents.

Difficulties are encountered in the design of compensating windings for polyphase commutator machines, on account of the difference in the phase relation between the armature currents which are to be neutralized and the brush currents which must be employed to secure the neutralization. Thus, the phase windings of the commutator winding are connected in mesh, and the currents in these phases add geometrically at the brushes to produce star-phase brush currents which are out of phase with the currents in the armature winding.

To overcome the difficulties just indicated, several arrangements have been proposed wherein the brush currents of all three phases are combined in each sector of the compensating winding in order to produce approximately the same magnetic conditions as those produced by the currents in the armature windings. Such arrangements are described in the Patent No. 1,084,040 to A. J. Scherbius and in the Patent No. 1,118,433 to H. Meyer-Delius, which show three-phase commutator machines employing commutator windings having a coil pitch of 120 electrical degrees. In said patents, the compensating winding consists of specially connected turns in which the brush currents of all three phases are combined in adjacent slots to produce a magnetic effect equal and opposite to the current flowing in a single phase of the mesh-connected commutator winding. In addition to the employment of complicated winding connections, the compensating windings of the foregoing patents, while giving approximately correct compensation over the entire pole face, do not provide exact compensation locally, since the currents flowing in the conductors in the oppositely-positioned slots of the stator and the rotor are not exact duplicates of each other. Furthermore, the compensating windings of these patents require approximately 15% more ampere turns than the armature, in order to produce the same magnetic action.

One object of my invention is to provide a compensating winding which is a substantially exact duplicate of the commutator winding and which will fully neutralize the magnetic effect of the armature current.

Another object of my invention is to provide a compensating winding which is so connected that its current distribution is substantially like that in the adjacent opposing portions of the commutator winding.

The subjects-matter and objects of my invention will better be understood by reference to the accompanying drawings, wherein—

Figure 1 is a diagrammatic view illustrating an induction-motor control system embodying my invention;

Fig. 2 is a diagrammatic view illustrating the principle embodied in the connections between the commutator winding, the compensating winding and the induction motor secondary winding of the organization shown in Fig. 1;

Fig. 3 is a diagrammatic view illustrating the current distribution in the commutator-type machine utilizing a double-layer commutator winding and a similar double-layer compensating winding;

Fig. 4 is a diagrammatic view illustrating the current distribution in a machine embodying my invention in connection with a single-layer winding; and Fig. 5 is a view similar to Fig. 2 illustrating a modification of my invention.

In Fig. 1 I have shown my invention as applied to a commutator machine employed in an induction-motor speed regulating set of a well known type. An induction motor 1 has a primary or stator member which is energized, through switches 2, from a polyphase supply line 3. The secondary or rotor member of the induction motor 1 carries a phase winding 4 which leads, through a set of six slip rings 5, to two sets of switches 6 and 7 respectively.

By closing the set of switches 7, the secondary winding may be connected to a variable polyphase resistor 8, for starting purposes.

In order to control the speed of the induction motor 1, the secondary winding 4 is connected, through the set of switches 6, to a regulating unit 10 consisting of a polyphase commutator machine 11 which is mechanically coupled to an induction motor 12. The induction motor 12 is connected, through switches 13, to the supply line 3. The commutator machine has three commutator brushes 14 which lead, through three-phase compensating windings 15 and the switches 6 mentioned above, to the secondary winding 4 of the induction motor.

The compensating windings 15 are so designed as to fully neutralize the magnetic action of the currents in the armature, and the peculiar features of such winding, which constitute the principal object of my invention, will be pointed out more fully hereinafter. To regulate the set, the commutator machine 11 is provided with shunt field windings 16 which are energized, through a controller 17, from an auxiliary frequency changer 18 which is driven by the induction motor in a familiar manner.

The principal feature of my invention is the arrangement and the connection of the compensating winding 15 which permits the utilization of a winding which is the exact duplicate of the commutator winding and which is so connected that the several elements of the compensating winding carry the same currents as the adjacent elements of the commutator winding.

The operation of the compensating winding 15 will best be understood by considering Fig. 2, wherein the winding elements 21, 22, 23 illustrate the three-phase-winding of the secondary winding 4 of the induction motor 1; the winding elements 24, 25, 26 are the three phase-windings of the compensating winding 15 of the commutator machine 11; and the winding 30 is the commutator winding of the machine 11 which cooperates with the three brushes 14.

Each phase element of the secondary winding 4 of the induction motor is connected in series to the corresponding phase element of the compensating winding 15, between the two brushes 14 leading to that phase element of the commutator winding 30 which faces said two phase elements of the compensating winding 15. Since the mesh circuit, including the phase elements 21 to 23 of the secondary winding 4 of the induction motor and the phase elements 24 to 26 of the compensating winding 15, corresponds, in every respect, to the mesh circuit of the commutator winding 30 to which it is connected through the three brushes 14, the current distribution in the corresponding phases of the two mesh circuits will be alike. Accordingly, if the corresponding phase elements of the commutator winding 30 and the compensating winding 15 are exactly alike and are connected in the proper direction, the magnetic effect of the commutator currents will be compensated by the corresponding currents in the compensating winding.

Fig. 3 shows the current distribution in the commutator winding 30 and in the compensating winding 15 of a commutator machine embodying the connections illustrated in Figs. 1 and 2. The commutator winding 30 is of the double-layer type such as is described in the above-mentioned Scherbius and Meyer-Delius patents. Assuming a coil pitch of 120° the three brushes 14 divide the winding into six phase-belts 31, 32, and 33, indicated by full lines, by dotted lines and chain-dotted lines, respectively. The compensating winding is an exact duplicate of the commutator winding and is opened at three points, corresponding to the points at which the brushes bear upon the commutator, providing the six elements 24 to 26 corresponding to the elements 31 to 33 of the commutator winding.

The three phase elements 21, 22 and 23, of the induction-motor winding 4 are connected in circuit, corresponding, to Fig. 2, as explained above.

The arrows in the phase belts 31 to 33 of the commutator winding 30 and in the phase belts of the compensating winding 15 indicate the respective directions of the flow of the currents in the two windings.

The artifice of connecting the elements of the compensating winding 15 and the elements of the energy-supply winding 4 in a mesh circuit similar to the mesh circuit of the commutator winding 30 thus permits, in a very simple manner, an exact duplication of the current conditions of the rotor in the compensating winding of the stator of the commutator machine 11.

The above-described system of compensating the effect of the armature winding is not confined to any particular type of winding, and the same effect may be secured with windings having a coil-pitch other than 120°, it being only necessary to open the compensating winding at the points at which the brushes lead to the commutator winding and to connect the winding elements as described above.

My invention is not restricted to induction-motor drives since any energy-translating device, for instance, any generator or transformer winding, may be employed in the same manner as the secondary winding 4 of the induction motor 1.

Fig. 4 shows the current distribution in a machine using a single-layer winding arranged in accordance with my invention. The compensating winding 40 which is similar to the commutator winding 41 is opened at three points corresponding to the brush connections, an element of the compensating winding being connected in series with an element of the energy-supply winding 43 between sets of adjacent brushes.

Fig. 5 illustrates my invention as applied to a single-phase machine, although, in general, there is no necessity for employing my winding connections in cases where the brush current has the same phase as the currents in the phase belts of the commutator winding as is the case in single phase machines.

The machine of Fig. 5 comprises an armature winding 45 of the commutator type and a compensating winding 46 which is an exact duplicate of the commutator winding. The compensating winding is divided at the two brushes 47, corresponding to the phase-belts of the commutator winding, and is connected in series with the transformer supply windings 48, between the brushes 47 bearing upon the commutator. In order to secure the same current distribution in both branches of the circuit including the compensating windings, a balancing reactor coil 49 is disposed in the connection leading to one of the brushes.

I claim as my invention:

1. A polyphase commutator machine comprising an armature core, a closed distributed winding thereon, a commutator cylinder associated with said distributed winding, a plurality of spaced brushes bearing on said commutator, a field core, compensating windings thereon for neutralizing the magnetic effects of the currents in said distributed winding, and external energy-translating windings connected with said compensating windings into a closed circuit having a plurality of terminals spaced similarly to the brush terminals of said distributed winding, the corresponding terminals of said two closed circuits being connected to each other.

2. In a commutator-type, dynamo-electric machine, the combination with a closed distributed commutator winding and a set of brushes cooperating with a plurality of spaced points upon the commutator of said winding, of compensating windings for said commutator winding and external energy-translating windings connected with said compensating windings into a closed circuit similar to said commutator winding, said closed circuit having a set of terminals distributed like, and, respectively, connected to, said brushes.

3. The combination, with a dynamo-electric machine comprising two relatively rotatable members, a closed winding on one of said members, a commutator for said winding, a set of brushes distributed upon said commutator, and compensating windings disposed upon the other of said members for neutralizing the magnetic effect of said commutator winding, of external energy-translating windings connected in series with said neutralizing windings into a closed circuit similar to the circuit of said commutator winding and connections between said brushes and similarly localed points on said closed circuit.

4. A dynamo-electric machine comprising stator and rotor members, a closed commutator winding on one of said members, a set of brushes cooperating with a plurality of points on said commutator winding, a compensating winding disposed on the other of said members and comprising a set of winding elements constituting substantially a duplicate of the commutator windings extending between the individual brushes, external energy-supply windings comprising a set of winding elements proportioned similarly to said commutator winding elements, the corresponding elements of said compensating windings and said energy-supply windings being connected in series between the brushes leading to the corresponding commutator-winding elements.

5. The combination with polyphase energy-supply windings having a plurality of phase elements, of a dynamo-electric machine connected to said windings, said machine comprising a member having a closed commutator winding, a set of brushes cooperating with said commutator winding, said brushes being so distributed that the winding elements between the brushes have the same relative proportions as said phase elements, compensating windings for said machine comprising a plurality of elements proportioned similarly to said commutator-winding elements, the corresponding elements of said energy-supply windings and said compensating winding being serially connected between corresponding brushes upon said commutator.

6. A dynamo-electric machine comprising stator and rotor members, a closed commutator winding on one of said members, a set of polyphase brushes cooperating with a plurality of points on said commutator winding, compensating windings disposed on the other of said members and comprising a set of polyphase winding elements constituting a substantially exact counter-part of said commutator windings, said winding elements being so connected to said brushes as to substantially fully neutralize the magnetic effect of said commutator winding, and means for connecting a polyphase external energy-translating device in operative relation to said commutator winding and said compensating winding.

7. A dynamo-electric machine comprising stator and rotor members, a double-layer distributed commutator winding on one of said members, a set of polyphase brushes coperating with a plurality of points on said commutator winding, a simliar compensating winding disposed on said other member, said compensating winding being subdivided into a plurality of separated elements corresponding to the elements of the commutator winding extending between adjacent brushes, the winding elements being so connected to said brushes as to substantially fully neutralize the magnetic effect of said commutator winding.

8. The combination with polyphase energy-supply windings having a plurality of phase elements, of a dynamo-electric machine comprising stator and rotor members, a double-layer distributed commutator winding on one of said members, a set of polyphase brushes cooperating with a plurality of points on said commutator winding, compensating windings disposed on the other of said members and comprising a set of polyphase winding elements constituting a substantially exact counterpart of said commutator windings, the corresponding phase-elements of said energy supply-winding being connected in series with the corresponding elements of said compensating winding between the brushes, in parallel to the corresponding elements of said commutator winding.

9. A three-phase commutator machine comprising an armature winding, a commutator associated therewith, three brushes bearing on said commutator, and a compensating field winding arranged in delta connection, said delta connection being opened at three equidistant points, a pair of terminal leads being connected at each opening in said delta, and the three corners of said delta connection being connected to said three brushes respectively, the openings in the delta connection being so located as to cause the armature currents to be effectually compensated.

10. A variable-speed cascaded set comprising an induction motor and a three-phase commutator machine, said commutator machine comprising an armature winding, a commutator associated therewith, three brushes bearing on said commutator, and a compensating field winding arranged in delta connection, said delta connection being opened at three equispaced points, a pair of terminal leads being connected at each opening in said delta, and the three corners of said delta connection being connected to said three brushes, respectively, said induction motor having a three-phase secondary winding, each of said secondary phases being connected to a separate pair of terminals, the three pairs of secondary terminals being connected, respectively, to the three pairs of terminal leads of said compensating field winding, and means associated with said commutator machine for varying the speed of the set.

In testimony whereof, I have hereunto subscribed my name this 21st day of May, 1925.

STANLEY G. NOTTAGE.